(12) United States Patent
Tanaka et al.

(10) Patent No.: US 10,947,064 B2
(45) Date of Patent: Mar. 16, 2021

(54) PIPE FOR TRANSPORTING POWDER AND METHOD FOR TRANSPORTING POWDER

(71) Applicant: Mitsubishi Chemical Engineering Corporation, Tokyo (JP)

(72) Inventors: Nobuhiro Tanaka, Tokyo (JP); Katsuhiro Murata, Tokyo (JP); Tetsuji Imamura, Tokyo (JP); Hironobu Takeda, Tokyo (JP); Tomoyuki Osada, Tokyo (JP)

(73) Assignee: MITSUBISHI CHEMICAL ENGINEERING CORPORATION, Tokyo (JP)

( * ) Notice: Subject to any disclaimer, the term of this patent is extended or adjusted under 35 U.S.C. 154(b) by 0 days.

(21) Appl. No.: 16/649,678

(22) PCT Filed: Feb. 2, 2018

(86) PCT No.: PCT/JP2018/003641
§ 371 (c)(1),
(2) Date: Mar. 23, 2020

(87) PCT Pub. No.: WO2019/064618
PCT Pub. Date: Apr. 4, 2019

(65) Prior Publication Data
US 2020/0255233 A1 Aug. 13, 2020

(30) Foreign Application Priority Data

Sep. 29, 2017 (JP) ............................. JP2017-190506

(51) Int. Cl.
*B65G 53/30* (2006.01)
*B65G 53/04* (2006.01)
*B65G 53/52* (2006.01)

(52) U.S. Cl.
CPC ........... *B65G 53/04* (2013.01); *B65G 53/521* (2013.01)

(58) Field of Classification Search
CPC ........ B65G 53/30; B65G 53/50; B65G 53/58; B65G 53/528; Y10T 137/2109
(Continued)

(56) References Cited

U.S. PATENT DOCUMENTS 3,251,291 A * 5/1966 Thompson ............... A23C 9/16
99/470
3,507,296 A * 4/1970 Fix ....................... G05D 7/0186
137/810
(Continued)

FOREIGN PATENT DOCUMENTS

JP   S50-016112   2/1975
JP   S58-135032 A   8/1983
(Continued)

OTHER PUBLICATIONS

Office Action in JP Application No. 2017-190506 dated Jul. 3, 2018, 6 pages.
(Continued)

*Primary Examiner* — Joseph A Dillon, Jr.
(74) *Attorney, Agent, or Firm* — Knobbe Martens Olson & Bear, LLP

(57) ABSTRACT

An object of the present invention is to provide a technique in which deposition of powder during pneumatic transport can be inhibited by a pipe body having a simple structure. The present invention is a pipe for transporting powder including a transport path which has a portion formed by a curved pipe and through which pneumatically transported powder passes, and a blowing path through which a gas is blown into the transport path from an opening formed on an inner circumferential surface of the curved pipe, in which
(Continued)

the blowing path blows the gas in a direction in which the gas blown into the transport path from the opening forms a swirling flow along the inner circumferential surface of the curved pipe.

7 Claims, 3 Drawing Sheets

(58) Field of Classification Search
USPC .......... 406/85, 92, 93, 94, 95, 194; 137/812, 137/813; 34/594
See application file for complete search history.

(56) References Cited

U.S. PATENT DOCUMENTS

| | | | | |
|---|---|---|---|---|
| 3,918,585 | A * | 11/1975 | Hagelstam | B65G 53/58 209/3 |
| 4,259,988 | A * | 4/1981 | Singh | F15C 3/04 137/812 |
| 4,749,313 | A * | 6/1988 | Hery | G21F 9/22 406/134 |
| 4,969,481 | A * | 11/1990 | Horii | G02B 6/4485 137/13 |
| 5,588,787 | A * | 12/1996 | Manjunath | C25C 3/14 406/85 |
| 6,609,871 | B2 * | 8/2003 | Pfeiffer | B65G 53/18 406/89 |
| 7,021,870 | B2 * | 4/2006 | Gille | B01J 8/0025 406/152 |
| 8,226,332 | B2 * | 7/2012 | Kojima | B01L 3/502761 406/198 |
| 8,834,074 | B2 * | 9/2014 | Leininger | B01F 5/0655 406/92 |
| 9,387,997 | B2 * | 7/2016 | Hu | B65G 53/523 |
| 9,446,915 | B2 * | 9/2016 | Sundholm | B04C 5/13 |
| 9,527,013 | B2 * | 12/2016 | Abdalla | B01D 21/24 |
| 9,868,595 | B1 * | 1/2018 | Scruggs | B65G 53/28 |
| 2003/0102038 | A1 | 6/2003 | Lane et al. | |
| 2003/0233144 | A1 * | 12/2003 | Antaki | A61M 1/101 623/3.26 |
| 2005/0173009 | A1 * | 8/2005 | Bowe | F16K 3/24 137/808 |
| 2008/0035226 | A1 * | 2/2008 | Conrad | C02F 1/006 137/808 |
| 2010/0300568 | A1 * | 12/2010 | Faram | E03F 5/106 137/810 |
| 2012/0279593 | A1 * | 11/2012 | Fripp | F15D 1/0015 137/599.01 |
| 2018/0305140 | A1 * | 10/2018 | Stark | B65G 53/58 |
| 2019/0219493 | A1 * | 7/2019 | Chang | G01N 15/0205 |

FOREIGN PATENT DOCUMENTS

| | | |
|---|---|---|
| JP | 60-103133 | 7/1985 |
| JP | S62-36221 A | 2/1987 |
| JP | H01-220638 A | 9/1989 |
| JP | H06-286874 A | 10/1994 |
| JP | H09-72499 A | 3/1997 |
| JP | H09-278183 A | 10/1997 |
| KR | 10-0960963 B1 | 6/2010 |

OTHER PUBLICATIONS

Office Action in JP Application No. 2017-190506 dated Nov. 20, 2018, 6 pages.
Office Action in JP Application No. 2017-190506 dated Mar. 12, 2019, 6 pages.
Office Action in JP Application No. 2017-190506 dated Jan. 28, 2020, 8 pages.
Search Report in International Application No. PCT-JP2018-003641 dated Apr. 3, 2018, 2 pages.

* cited by examiner

PIPE FOR TRANSPORTING POWDER AND METHOD FOR TRANSPORTING POWDER

TECHNICAL FIELD

The present invention relates to a pipe for transporting powder and a method for transporting powder.

BACKGROUND ART

Various techniques for inhibiting deposition of powder are used in a transport path through which pneumatically transported powder passes (for example, see PTL 1 to 4).

DOCUMENTS OF PRIOR ARTS

Patent Document

[PTL 1] Japanese Patent Application Publication No. H06-286874
[PTL 2] Japanese Patent Application Publication No. H09-072499
[PTL 3] Japanese Patent Application Publication No. H09-278183
[PTL 4] Japanese Patent Application Publication No. H01-220638

SUMMARY OF THE INVENTION

Problems to be Solved by the Invention

As countermeasures against deposition of powder in a transport path through which pneumatically transported powder passes, various countermeasures can be conceived such as, for example, blowing of air aimed at deposited powder, application of pulsation to an airflow for transporting powder, and blowing of an airflow from fine holes formed vertically and horizontally on an inner surface of a pipe. However, since blowing of air aimed at deposited powder is performed by interrupting pneumatic transport of powder, it is troublesome when applied to equipment intended for continuous processing of powder because interruption of processing is inevitable. Also, since the application of pulsation to an airflow for transporting powder inevitably causes fluctuation in a flow rate of the powder, there is a likelihood of adversely affecting the characteristics and the quality of the powder when applied to equipment that performs various treatments such as heating on the powder. Further, when the airflow is blown out from the fine holes formed vertically and horizontally on the inner surface of the pipe, the pipe body itself has a complicated structure, and thus it is extremely difficult to clean off a small amount of residual powder in the vicinity of the fine holes. Accordingly, there is a possibility of causing a problem of powder contamination when the method is applied to equipment in which production of multiple products is performed.

Therefore, an object of the present invention is to provide a technique in which deposition of powder during pneumatic transport can be inhibited by a pipe body having a simple structure.

Means for Solving the Problems

In order to solve the problems, in the present invention, a gas is blown into a curved pipe for a transport path through which powder passes in a direction in which the gas forms a swirling flow along an inner circumferential surface thereof.

In particular, the present invention is a pipe for transporting powder including a transport path which has a portion formed by a curved pipe and through which pneumatically transported powder passes, and a blowing path through which a gas is blown into the transport path from an opening formed on an inner circumferential surface of the curved pipe, in which the blowing path blows the gas in a direction in which the gas blown into the transport path from the opening forms a swirling flow along the inner circumferential surface of the curved pipe.

Although the above pipe has the portion formed by the curved pipe, a gas is blown from the blowing path into the transport path in the curved pipe portion. In addition, the gas from the blowing path forms a swirling flow along the inner circumferential surface of the curved pipe. Therefore, formation of two helical flows which are symmetric with respect to a plane including a central axis of the transport path having a curve shape and are generated when there is no gas blowing from the blowing path is prevented, and thus occurrence of a stagnation point which may be generated mainly in an inner circumferential portion of the curved pipe is inhibited as far as possible. As a result, in the pipe, deposition of solid particles in the curved pipe is prevented.

Further, the blowing path may blow the gas along a tangent to a circle that forms a cross-section of the curved pipe. Also, the blowing path may blow the gas from an outer circumferential side of the curved pipe toward a central point of a radius of curvature of the curved pipe. Also, the transport path may be formed of a 90-degree curved pipe, and the blowing path may blow the gas into the transport path from the opening at any portion between a 30-degree curved portion and a 60-degree curved portion of the curved pipe. Also, the transport path may be formed by a 90-degree curved pipe, and the blowing path may blow the gas into the transport path from the opening at a 45-degree curved portion of the curved pipe. When the gas blown from the blowing path into the transport path in the curved pipe portion is blown in this manner, formation of the two helical flows which are symmetric with respect to the plane including the central axis of the transport path having the curve shape is effectively prevented, and therefore, it is possible to prevent deposition of solid particles in the curved pipe as much as possible.

Further, the transport path may have a plurality of portions formed by the curved pipe, and the blowing path may blow the gas into the transport path from the respective openings on the inner circumferential surfaces of the plurality of curved pipes with a time difference therebetween. When the gas blown from the blowing path into the transport path in the curved pipe portion is blown in this way, fluctuation of the airflow in the entire transport path is inhibited.

Further, the present invention can also be understood as an aspect of a method. For example, the present invention may be a method for transporting powder, which includes the steps of: pneumatically transporting the powder using a transport path having a portion formed by a curved pipe; and blowing the gas from an opening formed on an inner circumferential surface of the curved pipe in a direction in which the gas blown into the transport path forms a swirling flow along the inner circumferential surface of the curved pipe.

Effects of the Invention

According to the pipe for transporting powder and the method for transporting powder described above, deposition

MODE FOR CARRYING OUT THE INVENTION

Hereinafter, an embodiment will be described. The embodiment described below is merely an example and does not limit the technical scope of the present disclosure to the following aspects.

Figure 1:
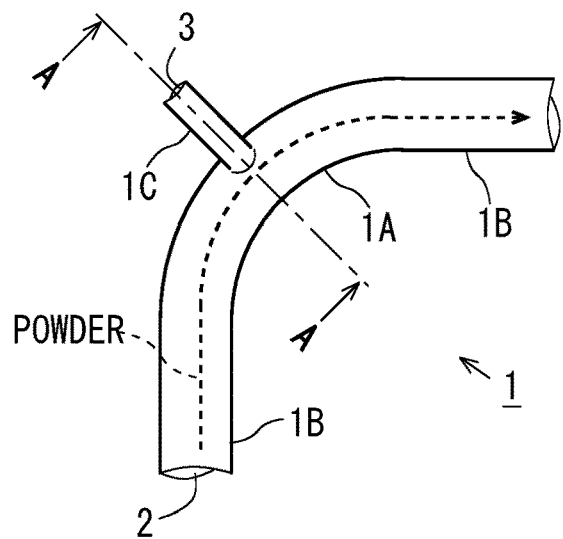
FIG. 1 is a diagram showing a pipe according to an embodiment.

FIG. 1 is a diagram showing a pipe 1 according to an embodiment. The pipe 1 is a pipe used for pneumatic transport of powder and includes a curved pipe 1A and straight pipes 1B connected to both ends of the curved pipe 1A. The curved pipe 1A and the straight pipes 1B form a transport path 2 through which pneumatically transported powder passes. The curved pipe 1A and the straight pipe 1B may be integrally formed by welding or the like or may be connected to each other via a flange or the like. Also, although FIG. 1 shows a state in which the curved pipe 1A connects the straight pipes 1B to each other at an angle of 90 degrees, the curved pipe 1A may connect the straight pipes 1B to each other at a more obtuse angle than 90 degrees, or may connect the straight pipes 1B to each other at a more acute angle than 90 degrees. Further, although FIG. 1 shows a state in which the curved pipe 1A connects the straight pipes 1B to each other, other curved pipes may be connected to both ends or one end of the curved pipe 1A.

The pipe 1 includes, in addition to the curved pipe 1A and the straight pipes 1B, a branch pipe 1C connected to an outer circumferential surface of the curved pipe 1A. The branch pipe 1C forms a blowing path 3 through which a gas blown into the transport path 2 passes. The branch pipe 1C may be formed integrally with the curved pipe 1A by welding or the like or may be connected thereto via a flange or the like. The branch pipe 1C is connected to the curved pipe 1A from immediately beside an outer circumferential side of the curved pipe 1A. Therefore, the blowing path 3 formed by the branch pipe 1C blows the gas from the outer circumferential side of the curved pipe 1A toward a central point of a radius of curvature of the curved pipe 1A.

Further, although FIG. 1 shows a state in which the branch pipe 1C is provided at a 45-degree curved portion of the curved pipe 1A having an angle of 90 degrees, the branch pipe 1C is not limited to this form. The branch pipe 1C may be provided, for example, at any portion between a 30-degree curved portion and a 60-degree curved portion of the curved pipe 1A.

Figure 2:
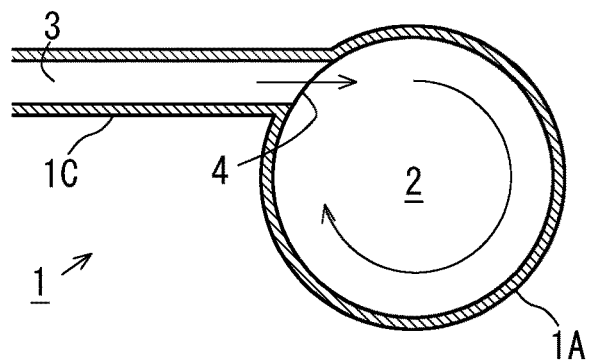
FIG. 2 is a cross-sectional view of the pipe taken along a dashed line indicated by reference sign A-A in FIG. 1.

In contrast, the branch pipe 1C is a circular pipe thinner than the curved pipe 1A. In addition, in order for the gas blown from the blowing path 3 into the transport path 2 to be a swirling flow along the inner circumferential surface of the curved pipe 1A, the branch pipe 1C is connected to the curved pipe 1A at a position where a central axis thereof is near the tangent to the curved pipe 1A. FIG. 2 is a cross-sectional view of the pipe 1 taken along a dashed line indicated by reference sign A-A in FIG. 1.

As shown in FIG. 2, the branch pipe 1C is a circular pipe thinner than the curved pipe 1A. In addition, the branch pipe 1C forms the blowing path 3 which blows a gas from an opening 4 formed in the inner circumferential surface of the curved pipe 1A into the transport path 2. Further, the branch pipe 1C is connected to the curved pipe 1A at a position where the central axis is near the tangent to the curved pipe 1A. Therefore, as indicated by arrows in FIG. 2, the gas blown from the blowing path 3 into the transport path 2 forms a swirling flow along the inner circumferential surface of the curved pipe 1A. As a result, the powder that is being pneumatically transported while flowing through the transport path 2 receives an airflow from the blowing path 3 that is blown into the transport path 2 from the opening 4 while passing through the curved pipe 1A, thereby forming a swirling flow in the transport path 2.

Figure 3:
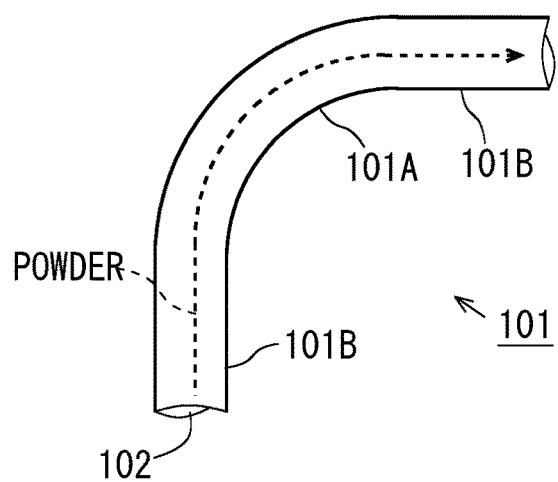
FIG. 3 is a diagram showing a pipe according to a comparative example.

Since effects of the pipe 1 have been verified, the verified results will be shown below. FIG. 3 is a diagram showing a pipe 101 according to a comparative example. The pipe 101 is the same as the pipe 1 except that the branch pipe 1C is omitted. That is, similarly to the pipe 1, the pipe 101 includes a curved pipe 101A and straight pipes 101B, which form the transport path 102.

Figure 4:
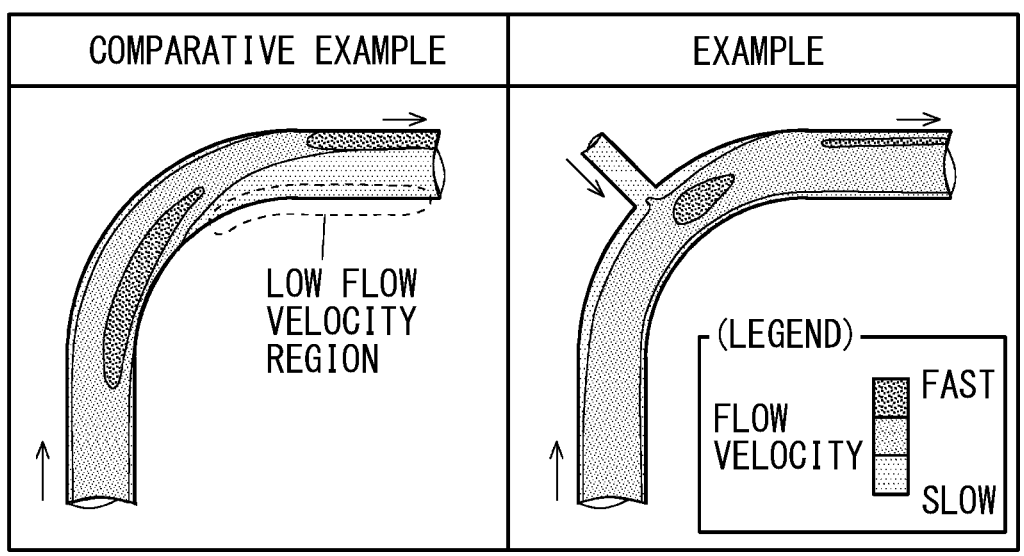
FIG. 4 is a diagram showing a distribution in flow velocity of an airflow flowing through a transport path.

In the present verification, distributions of airflows flowing through the transport paths 2 and 102 were compared. FIG. 4 is a diagram showing distributions in flow velocity of airflows flowing through the transport paths 2 and 102. As shown in FIG. 4, in the comparative example, a low flow velocity region is generated in a portion downstream from around a 45-degree curved portion of the curved pipe 101A having an angle of 90 degrees. In addition, comparing the comparative example with the example, it can be seen that the low flow velocity region appearing in the transport path 102 in the comparative example is almost eliminated in the example. The reason why the low flow velocity region appearing in the transport path 102 in the comparative example is eliminated in the case of the example will be described below.

Figure 5:
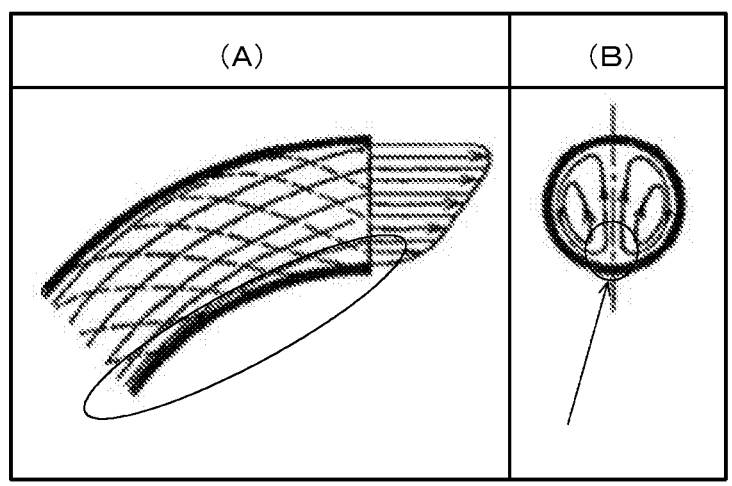
FIG. 5 is a diagram showing a direction of the airflow flowing in the transport path by using arrows.

FIG. 5 is a diagram in which a direction of the airflow flowing in the transport path 102 is indicated by arrows. When a fluid flowing through the transport path 102 enters the curved pipe 101A from the straight pipe 101B, the fluid flow gradually changes along a curvature of the curved pipe 101A. Then, as shown in FIG. 5(B), two helical flows symmetric with respect to a plane including a central axis of the transport path 102 having a curve shape formed by the curved pipe 101A are formed. These helical flows are hereinafter referred to as "secondary flows" in the present application.

Since the pipe 1 is used for pneumatic transport of powder, the present verification is also based on the premise that a solid-gas mixed phase flow, in which gas and solid particles are mixed and flow, flows in the transport paths 2 and 102. Here, the flow of the solid particles in the solid-gas mixed phase flow is not always the same as the flow of the gas carrying the solid particles. For example, solid particles with large particle sizes are less influenced by a gas flow than solid particles with small particle sizes, and accordingly, when entering the curved pipe 101A from the straight pipe 101B, they travel linearly toward a pipe wall of the curved pipe 101A on the outer circumferential side. However, for example, in the pneumatic transport of fine powders such as a medicine which particularly has to avoid contamination, a flow of the powder that greatly deviates from the gas flow is unlikely to occur. In addition, since a powder that greatly deviates from the gas flow has a large particle size, contamination resulting from deposition of such large-sized solid particles, which is unrelated to an adsorptive force due to static electricity generated by friction between the solid-gas mixed phase flow that causes a fine powder to be deposited in the pipe and on the pipe wall, is less likely to be a problem, for example, when compared to standards required in fields such as pharmaceuticals. Therefore, in the present verification, consideration is made on the premise that solid particles that are transported by pneumatic transport follow the same flow as the gas flow.

Due to the secondary flows generated in the curved pipe 101A when the solid-gas mixed phase flow flowing through the transport path 102 enters the curved pipe 101A from the straight pipe 101B, a portion where the secondary flows confront each other is generated at an inner circumferential portion of the curved pipe 101A indicated by a straight arrow in FIG. 5(B), with a plane including the central axis of the transport path 102 having a curve shape formed by the curved pipe 101A sandwiched therebetween. As a result, a stagnation point is generated in the inner circumferential portion of the curved pipe 101A, and solid particles are deposited. The low flow velocity region shown as the "comparative example" in FIG. 4 can be said to be a site where such a stagnation point appears. Therefore, in the pipe 101, solid particles are deposited at a portion on a downstream side from around the 45-degree curved portion of the curved pipe 101A.

In contrast, in the pipe 1, the branch pipe 1C is provided at the 45-degree curved portion of the curved pipe 1A. In addition, due to the gas blown into the transport path 2 from the blowing path 3 formed by the branch pipe 1C, a swirling flow is generated along the inner circumferential surface of the curved pipe 1A in the transport path 2. Therefore, in the portion on the downstream side from around the 45-degree curved portion of the curved pipe 1A, the secondary flows that appear in the pipe 101 are eliminated, thereby inhibiting occurrence of a stagnation point as shown in the "example" in FIG. 4. Therefore, in the pipe 1, deposition of solid particles in the curved pipe 1A is prevented.

Figure 6:
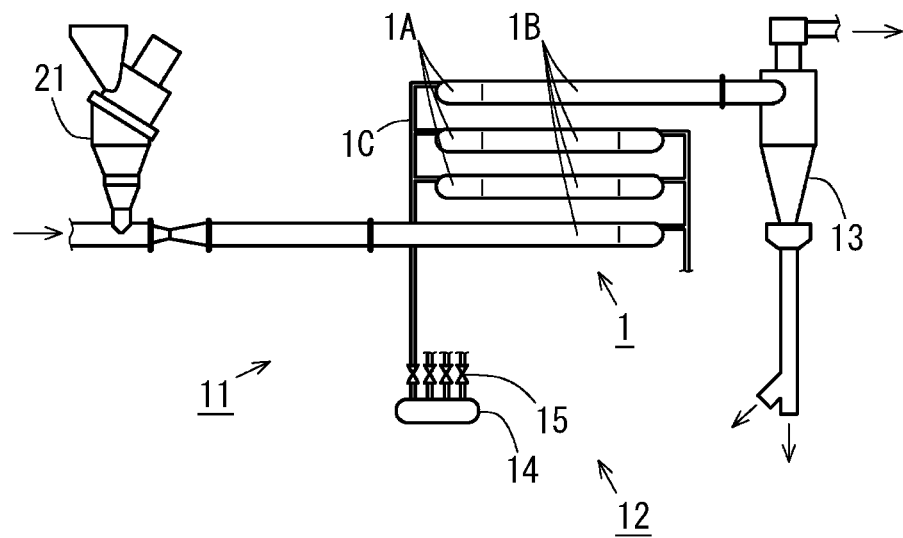
FIG. 6 is a first diagram showing an application example of the pipe.
Figure 7:
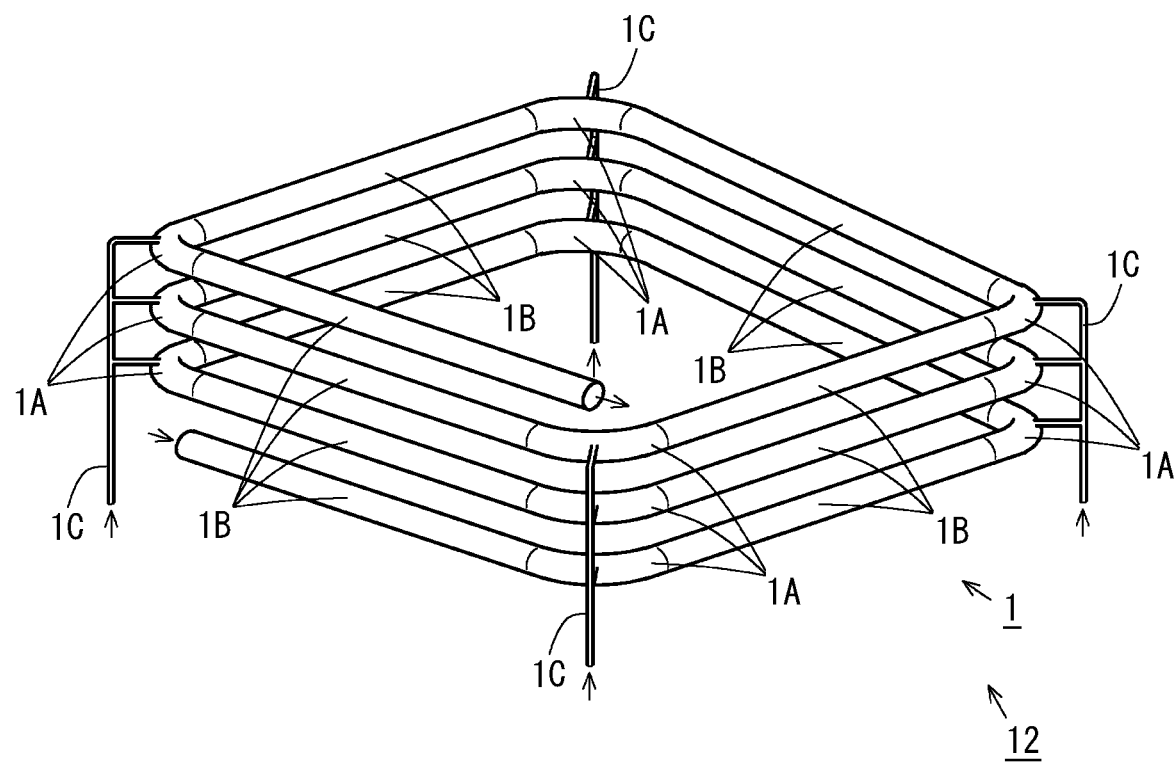
FIG. 7 is a second diagram showing an application example of the pipe.

FIG. 6 is a first diagram showing an application example of the pipe 1. FIG. 7 is a second diagram showing an application example of the pipe 1. The pipe 1 can be used, for example, for a dryer 12 of a drying unit 11 used for continuous production of a preparation, as shown in FIG. 6. The dryer 12 is formed of a spiral pipe 1 formed in a substantially rectangular shape when viewed from above, and includes straight pipes 1B forming straight parts, curved pipes 1A forming corner parts, and branch pipes 1C connected to the curved pipes 1A. Further, the dryer 12 includes a header 14 for supplying compressed air to the branch pipes 1C and solenoid valves 15. The drying unit 11 dries particles granulated in a granulation unit 21 in the spiral pipe 1 forming the dryer 12. In addition, the drying unit 11 further has a cyclone 13 that performs sorting of particle sizes on a downstream side of the dryer 12 into which the particles granulated in the granulation unit 21 that is a host device are conveyed by pneumatic transport.

In the drying unit 11, control of four solenoid valves 15 is performed such that any one of four solenoid valves 15 opens, so that compressed air of the header 14 is sequentially supplied to four branch pipes 10 connected to the curved pipes 1A at four corners of the dryer 12. The four solenoid valves 15 are sequentially opened at regular time intervals using a timer. By opening the four solenoid valves 15 at regular time intervals, the gas is blown into the transport path 2 from the openings 4 on the inner circumferential surfaces of the plurality of curved pipes 1A in the pipe 1 with time differences therebetween. Therefore, as compared to the case in which the four solenoid valves 15 are simultaneously opened, fluctuation in flow rate applied to the solid-gas mixed phase flow passing through the transport path 2 in the pipe 1 is inhibited.

Since the pipe 1 of the above embodiment has, for example, a simple pipe structure as compared to a form in which airflow is blown out from fine holes formed vertically and horizontally on an inner surface of the pipe body, contamination of powder remaining in the pipe body is not easily caused. In addition, since the pipe 1 of the above embodiment prevents the powder from remaining using the gas blown from the blowing path 3, there is no need to interrupt pneumatic transport of powder such as blowing of air aimed at deposited powder. Further, since the pipe 1 of the above embodiment blows the gas in a swirling flow along the inner circumferential surface from the blowing path 3, variation in a transport amount of the powder is small, for example, as compared to the case of pulsating the airflow that transports the powder. Therefore, for example, the present invention is suitable for equipment, in which it is desired to remove an influence on properties and quality of powder as much as possible, such as for continuous production of medicine.

Also, the pipe 1 of the above embodiment is not limited to the case applied to the location as shown in FIG. 6. The pipe 1 of the above embodiment is applicable to various facilities for pneumatic transport of powder.

DESCRIPTION OF THE REFERENCE NUMERALS AND SYMBOLS 1, 101 Pipe
1A, 101A Curved pipe
1B, 101B Straight pipe
1C Branch pipe
2, 102 Transport path
3 Blowing path
4 Opening
11 Drying unit
12 Dryer
13 Cyclone
14 Header
15 Solenoid valve
21 Granulation unit

The invention claimed is:

1. A pipe for transporting powder comprising:
    a transport path which has a portion formed by a curved pipe and through which pneumatically transported powder passes; and
    a blowing path through which a gas is blown into the transport path from an opening formed on an inner circumferential surface of the curved pipe,
    wherein the blowing path blows the gas in a direction in which the gas blown into the transport path from the opening forms a swirling flow along the inner circumferential surface of the curved pipe by blowing the gas into a tangential direction of a circle of a cross section of the curved pipe.

2. The pipe for transporting powder according to claim 1, wherein the blowing path blows the gas along a tangent to a circle that forms a cross-section of the curved pipe.

3. The pipe for transporting powder according to claim 1, wherein the blowing path blows the gas from an outer circumferential side of the curved pipe toward a central point of a radius of curvature of the curved pipe.

4. The pipe for transporting powder according to claim 1, wherein
   the transport path is formed of a 90-degree curved pipe, and
   the blowing path blows the gas into the transport path from the opening at any portion between a 30-degree curved portion and a 60-degree curved portion of the curved pipe.

5. The pipe for transporting powder according to claim 1, wherein
   the transport path is formed by a 90-degree curved pipe, and
   the blowing path blows the gas into the transport path from the opening at a 45-degree curved portion of the curved pipe.

6. A pipe for transporting powder comprising:
   a transport path which has a portion formed by a curved pipe and through which pneumatically transported powder passes; and
   a blowing path through which a gas is blown into the transport path from an opening formed on an inner circumferential surface of the curved pipe,
   wherein the blowing path blows the gas in a direction in which the gas blown into the transport path from the opening forms a swirling flow along the inner circumferential surface of the curved pipe,
   wherein the transport path has a plurality of portions formed by the curved pipes, and
   the blowing path blows the gas into the transport path from the respective openings on the inner circumferential surfaces of the plurality of curved pipes with a time difference therebetween.

7. A method for transporting powder comprising:
   pneumatically transporting the powder using a transport path having a portion formed by a curved pipe; and
   blowing the gas from an opening formed on an inner circumferential surface of the curved pipe in a direction in which the gas blown into the transport path forms a swirling flow along the inner circumferential surface of the curved pipe by blowing the gas into a tangential direction of a circle of a cross section of the curved pipe.

\* \* \* \* \*

UNITED STATES PATENT AND TRADEMARK OFFICE
CERTIFICATE OF CORRECTION

PATENT NO. : 10,947,064 B2  
APPLICATION NO. : 16/649678  
DATED : March 16, 2021  
INVENTOR(S) : Tanaka et al.

It is certified that error appears in the above-identified patent and that said Letters Patent is hereby corrected as shown below:

In the Specification

In Column 5, Line 66, delete "10" and insert --1C--.

In Column 6, Line 38, delete "1, 101" and insert --1,101--.

In Column 6, Line 42, delete "2, 102" and insert --2,102--.

In the Claims

In Column 6, Line 63, delete "cross section" and insert --cross-section--.

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*